United States Patent
Tsai

[19]

[11] Patent Number: 5,876,620
[45] Date of Patent: Mar. 2, 1999

[54] LOW-TEMPERATURE KEEPING SUBSTANCE STUFFED IN A COOL MUG

[76] Inventor: Yao-Ming Tsai, No. 86, Chi Nan Road, Ta She Hsiang, Kaohsiung Hsien, Taiwan

[21] Appl. No.: 935,806

[22] Filed: Aug. 7, 1997

Related U.S. Application Data

[63] Continuation-in-part of Ser. No. 609,796, Mar. 1, 1996, abandoned.

[51] Int. Cl.$^6$ ..................................................... F25D 3/08
[52] U.S. Cl. ............................................. 252/70; 62/457.3
[58] Field of Search ............................. 62/457.3; 252/70, 252/67, 69

[56] References Cited

U.S. PATENT DOCUMENTS

| | | | |
|---|---|---|---|
| 4,273,667 | 6/1981 | Kent et al. | 252/70 |
| 5,573,141 | 11/1996 | Chen | 62/457.3 |
| 5,609,039 | 3/1997 | Green et al. | 62/457.3 |

*Primary Examiner*—Melissa Bonner
*Attorney, Agent, or Firm*—Rosenberg, Klein & Bilker

[57] ABSTRACT

The present invention relates to a low-temperature keeping substance which is packed into a closed chamber formed between two rims of a cool mug to keep drinks held in the cool mug cold and comprises water, water absorptive polymer of acrylate resin polymer, stuffed into a chamber of a cool mug; wherein the water and water absorptive polymer are in the ratio of 13:1 (c.c.:g) mixed together as a low-temperature keeping substance which expands and becomes a semisolid one. CaCl can also be used as a freeze-resist substance and Sodium Benzoate used as a preservative and antiseptic so as to prevent the low-temperature keeping substance from being a sharp ice as well as increase the safety when a consumer uses it. Besides, the low-temperature keeping substance has various colors and makes the cool mug look colorful in an aesthetically pleasing manner and gives people a pleasant feeling.

3 Claims, 4 Drawing Sheets

LOW-TEMPERATURE KEEPING SUBSTANCE STUFFED IN A COOL MUG

CROSS-REFERENCE TO RELATED PATENT APPLICATIONS

This application is a Continuation-in-Part application of application Ser. No. 08/609,796, filed 1 Mar. 1996 now abandoned.

OBJECTS OF THE PRESENT INVENTION

The main object of the present invention is to provide a low-temperature keeping substance developed to be inserted into a cool mug so that drinks held inside the cool mug are kept cool for a desirably long time period.

BACKGROUND OF THE INVENTION

A heretofore known cool mug, referring to FIG. 1, is provided which has two rims 10, 11, forming a closed chamber in which water is held.

The cool mug 1 of the prior art is provided to keep drinks held therein cold and is initially kept in a freezer so that the water held in the closed chamber becomes ice. According to experience, approximately four hours is needed for water to freeze to be ready for use.

Considering the fact that water expands when it freezes and that it takes a relatively long time for water to freeze, only part of the closed chamber is used to hold the water.

From the above discussion, it can be understood that the cool mug 1 has disadvantages as follows:

1. The four hours needed for water to freeze is generally too long to meet users' needs; and,
2. The low temperature keeping effect of the cool mug 1 is generally available for only one hour.

SUMMARY OF THE INVENTION

The present invention relates to a low-temperature keepikng substance, which is inserted into a cool mug so that a more desirable effect of keeping drinks held in the cool mug at a low temperature may be achieved.

The low-temperature keeping substance of the instant invention comprises water and a water absorptive polymer of an acrylate resin polymer in the ratio of 13:1 cubic centimeters:grams (cc:g) mixed and stuffed into the closed chamber of the cool mug; wherein the water absorptive polymer is a block of small particles of solids which expand when soaked in water.

The cool mug, after having the low-temperature keeping substance inserted, is kept in a freezer for use and users can use the cool mug generally within one hour after it is put into the freezer. The low-temperature keeping substance also can become soft due to the use of the CaCl as a freeze-resist substance and Sodium Benzoate as a preservative/antiseptic that make the heat absorption slow and result in the serving time being prolonged.

The low-temperature keeping substance has various colors and makes the cool mug look colorful in an aesthetically pleasing manner and gives people a pleasant feeling.

BRIEF DESCRIPTION OF THE DRAWINGS

The invention will be better understood by reference to the accompanying drawings, wherein.

DESCRIPTION OF THE PREFERRED EMBODIMENTS

Figure 1:
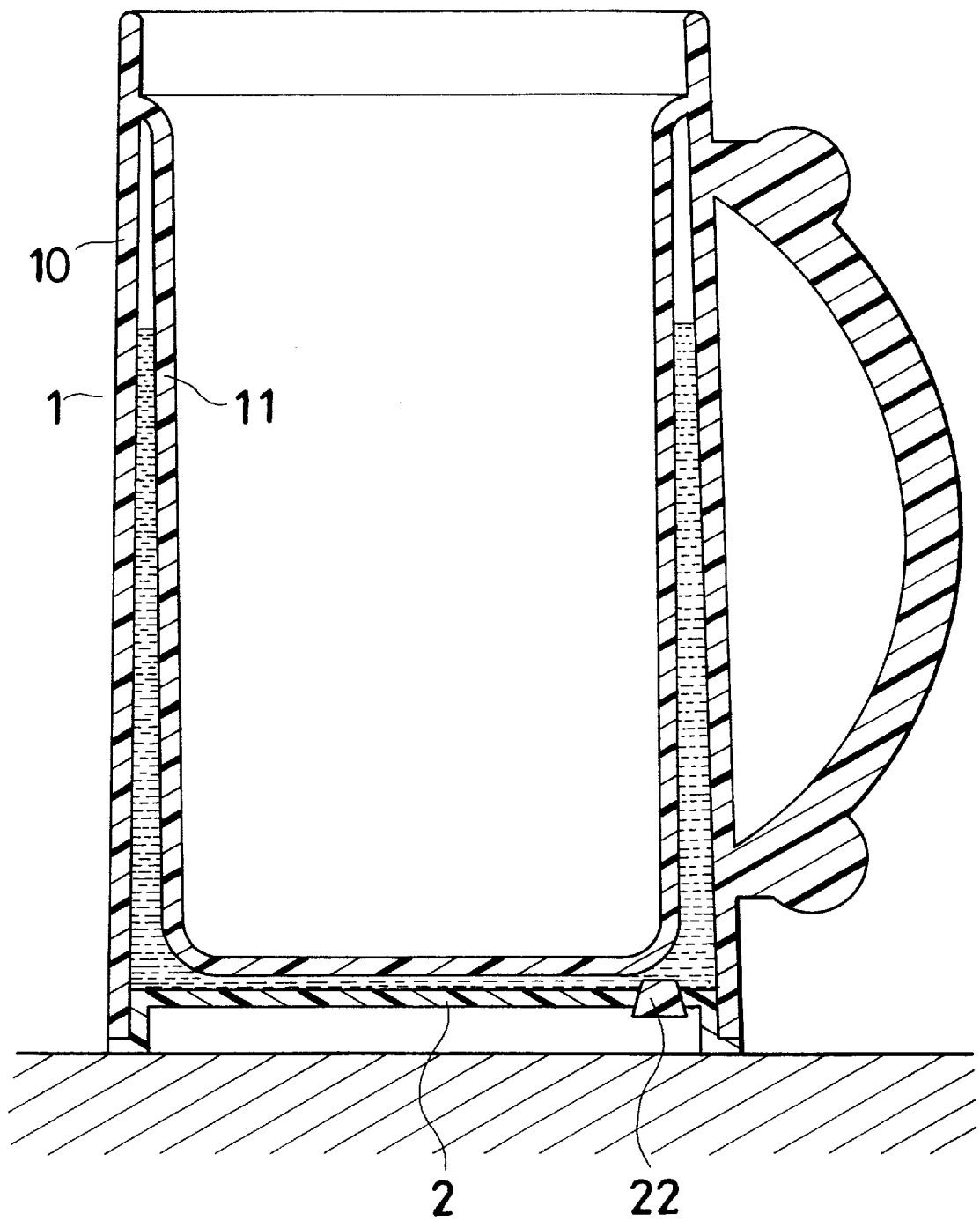
FIG. 1 is a cross-sectional view of a prior art cool mug.

A low-temperature keeping substance stuffed in a cool mug of the present invention is provided, which is packed or inserted into a cool mug 1 within closed chamber 12 defined between wall 11 of an inner vessel, and side wall 10 and bottom wall 2 of an outer vessel, so that drinks may be maintained in a cold state for an extended period of time.

Figure 2:
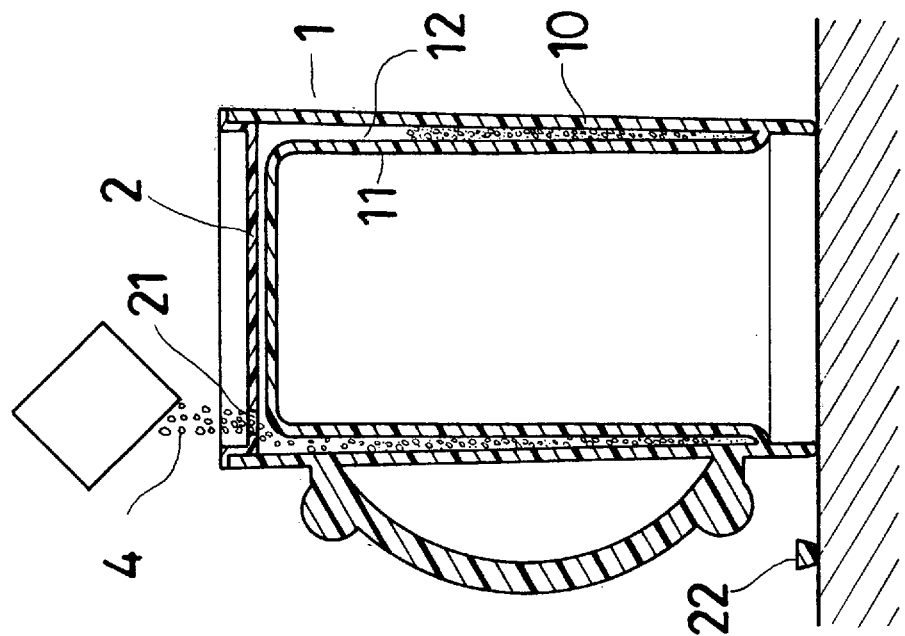
FIG. 2 is an operation view (1) of the present invention.
Figure 3:
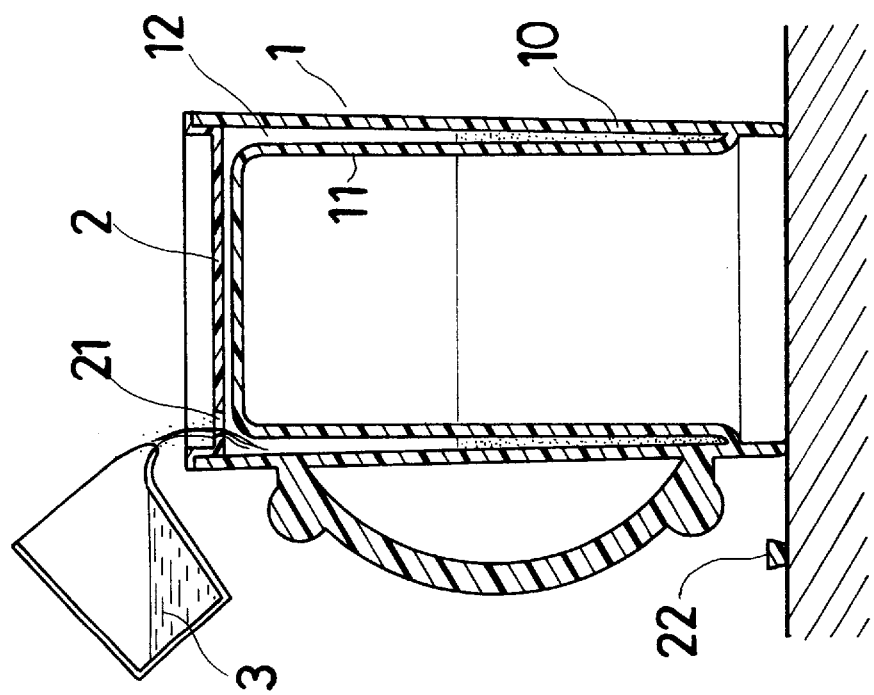
FIG. 3 is an operation view (2) of the present invention.
Figure 4:
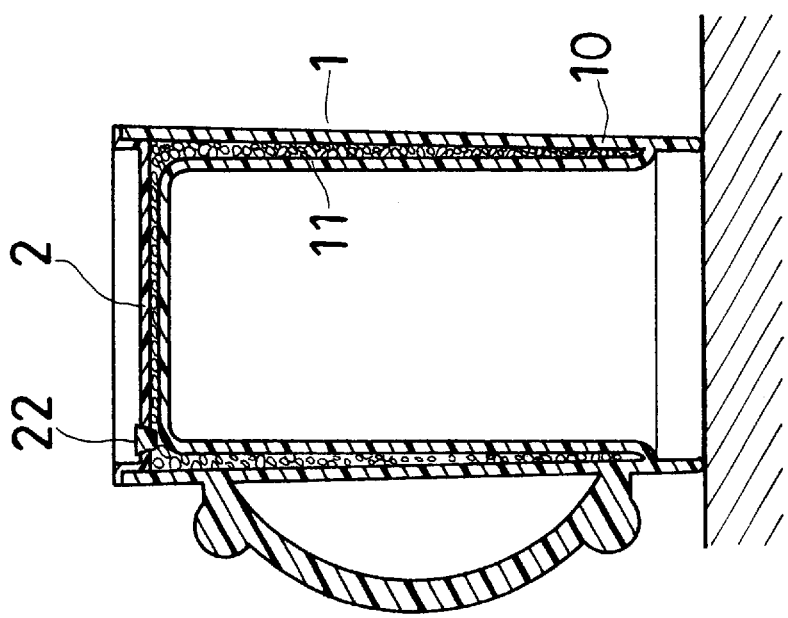
FIG. 4 is an operation view (3) of the present invention.
Figure 5:
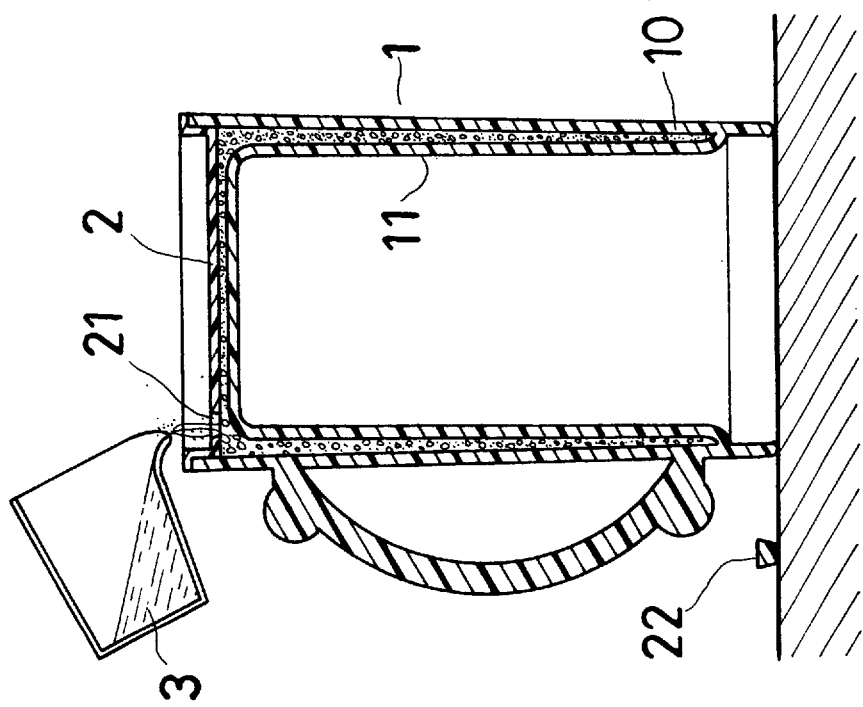
FIG. 5 is an operation view (4) of the present invention.
Figure 6:
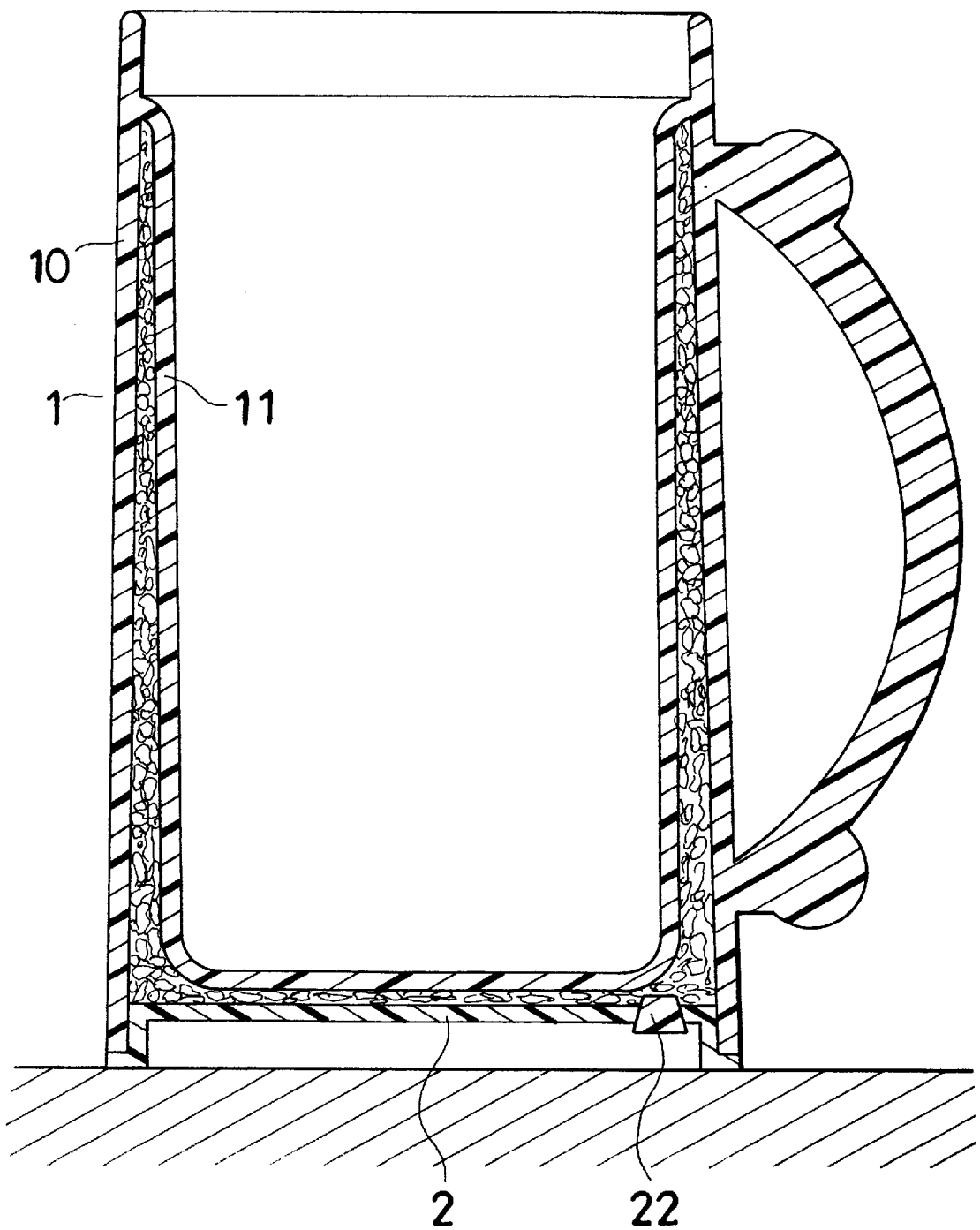
FIG. 6 is a sectional view of the present invention.

In an example, a cool mug 1 having an external diameter 7.2 cm and a height of 11 cm holds water 3 and a water absorptive polymer of an acrylate resin polymer 4 in the ratio of 13:1 (cc:g) into the closed chamber 12 of the cool mug 1, that mixture being a novel low-temperature keeping substance in a cool mug 1. A preferred embodiment of this invention mixes 105 cc of water and 8 g of a water absorptive polymer together and such has an excellent appearance of the low-temperature keeping substance. The aforementioned constituents are delivered into closed chamber 12 through an initially unsealed or unplugged fill hole 21 provided through bottom wall 2 of the outer vessel, as shown in FIGS. 2–4. Thereafter, sealing plug 22 is used to plug and seal shut fill hole 21, as shown in FIGS. 5 and 6. The water absorptive polymer may be a polymer having the formula:

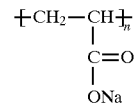

Further, the water absorptive polymer is a block of small particles of solids which expand many times when soaked in water; after the water is completely absorbed by the water absorptive polymer, it becomes a semisolid low-temperature keeping substance and fully fills the chamber 12, so that it conducts the temperature more quickly and causes the cool mug to reach a freezing state easily. Whereas in the prior art device, water is poured into the chamber of the cool mug and doesn't occupy the whole chamber, due to the expansion of water when it is freezing, and the prior art device needs a long time for water to freeze.

With above-mentioned semisolid low-temperature substance filled in the chamber of the cool mug, the freezing time is shortened. It has also been found that the low-temperature keeping substance can include the CaCl as a freeze-resist substance and Sodium Benzoate as a preservative/antiseptic to decrease melt speed as well as elongate the melting time. Based on experimental data, it has been found that the low-temperature keeping substance maintains freezing for 2 or 3 hours, which is much longer than the one hour serving time of the heretofore known prior art cool mug, as previously described.

Furthermore, the low-temperature keeping substance has various colors imparted thereto which makes the cool mug colorful and aesthetically pleasing, giving people a pleasant feeling.

While the preferred embodiments of the invention have been described above, it will be recognized and understood that various modifications may be made therein and the appended Claims are intended to cover all such modifications which may fall within the spirit and scope of the invention.

What is claimed is:

1. A cooling mug apparatus, comprising:

an outer vessel having an open upper end;

an inner vessel suspended within said outer vessel and adapted to receive beverages therein, an upper rim of said inner vessel being integrally joined to an inner periphery of said outer vessel proximate said open upper end thereof, an outer surface of said inner vessel and an inner surface of said outer vessel defining a sealed chamber therebetween; and, a semi-solid cooling substance completely filling said sealed chamber, said cooling substance formed from a mixture of water and a water absorptive polysodium acrylate polymer in the approximate ratio of 13:1 (cc:g).

2. The apparatus as recited in claim 1 where said mixture of water and polysodium acrylate polymer includes 105 cc of water and 8 g of said polysodium acrylate polymer combined in said sealed chamber to form said semi-solid cooling substance.

3. The apparatus as recited in claim 1 further comprising CaCl added to said mixture to impart freezing resistant properties thereto, and sodium benzoate added to said mixture as a preservative and antiseptic.

* * * * *